United States Patent [19]

Mahoney et al.

[11] 4,200,714

[45] Apr. 29, 1980

[54] OLEFIN PURIFICATION PROCESS FOR HYDROGEN CONTAMINATED STREAMS

[75] Inventors: John A. Mahoney, Glen Ellyn; Clifton G. Frye, Naperville, both of Ill.

[73] Assignee: Standard Oil Company (Indiana), Chicago, Ill.

[21] Appl. No.: 948,333

[22] Filed: Oct. 4, 1978

[51] Int. Cl.$^2$ .......................... C08F 6/00; C07C 5/04
[52] U.S. Cl. ...................... 526/68; 526/77; 585/255
[58] Field of Search ............... 526/68, 77; 260/677 A; 585/255

[56] References Cited

U.S. PATENT DOCUMENTS

| | | | |
|---|---|---|---|
| 3,758,603 | 9/1973 | Steigelmann et al. | 260/677 A |
| 3,758,605 | 9/1973 | Hughes et al. | 260/677 A |
| 3,770,842 | 11/1973 | Steigelmann et al. | 260/677 A |
| 3,776,979 | 12/1973 | Hill | 260/878 B |
| 3,812,651 | 5/1974 | Steigelmann | 55/16 |
| 3,823,529 | 7/1974 | Hughes et al. | 55/16 |
| 3,844,735 | 10/1974 | Steigelmann et al. | 55/16 |
| 3,864,418 | 2/1975 | Hughes et al. | 260/677 A |
| 3,865,890 | 2/1975 | Steigelmann et al. | 55/16 |
| 3,892,665 | 7/1975 | Steigelmann et al. | 210/490 |
| 3,909,207 | 9/1975 | Bir | 23/285 |
| 3,912,698 | 10/1975 | Shurts | 526/68 |
| 3,940,469 | 2/1976 | Steigelmann et al. | 264/177 F |
| 3,951,621 | 4/1976 | Hughes et al. | 55/16 |
| 3,980,605 | 9/1976 | Steigelmann et al. | 260/30.8 DS |
| 3,984,350 | 10/1976 | Karayannis et al. | 252/429 B |
| 3,995,097 | 11/1976 | Brown et al. | 526/74 |
| 4,003,712 | 1/1977 | Miller | 23/288 S |
| 4,014,665 | 3/1977 | Steigelmann | 55/16 |
| 4,015,955 | 4/1977 | Steigelmann et al. | 55/16 |
| 4,039,499 | 8/1977 | Steigelmann et al. | 260/29.6 N |
| 4,047,908 | 9/1977 | Steigelmann et al. | 55/158 |
| 4,060,566 | 11/1977 | Yahnke | 260/677 A |

*Primary Examiner*—Stanford M. Levin
*Attorney, Agent, or Firm*—Frank J. Sroka; William T. McClain; William H. Magidson

[57] ABSTRACT

Disclosed is a process for the removal of hydrogen from streams comprising olefinic compounds, such as streams from a polymerization reactor. At least a portion of the olefinic compounds are saturated with a substantial portion of the hydrogen present so as to effectively remove hydrogen from the stream. The saturated material formed can be then separated from unreacted olefinic compounds by use of a membrane separator and the olefinic compounds recycled to a polymerization zone for reaction.

16 Claims, 2 Drawing Figures

OLEFIN PURIFICATION PROCESS FOR HYDROGEN CONTAMINATED STREAMS

BACKGROUND

This invention relates to the recovery of olefinic compounds from streams comprising olefinic compounds, especially the recovery and recycle to polymerization zones of such olefinic compounds. This invention also relates to a process for the removal of hydrogen from streams comprising olefinic compounds.

As is well known, the polymerization of olefinic compounds is a commercially important process in view of the multitude of uses of polymers and copolymers. Two of the most commercially important polymers are polyethylene and polypropylene; however, a myriad of other polymers and copolymers have been found commercially important. For example, ethylene is not only often polymerized with itself to form polyethylene, but also with other olefinic materials such as propylene, alpha olefins, acrylates, vinyl acetates, and the like. Therefore, for the purposes of this disclosure, the term polymerization shall include copolymerization.

Commonly the olefinic compounds or mixture of olefinic compounds to be polymerized is passed into a reaction zone where polymerization takes place. Generally a catalyst is used to promote such polymerization. Commonly a quench solvent such as a saturated hydrocarbon, for example isobutane or isopentane, is added to cool the contents of the reaction zone and thereby control the reaction. As is well known the polymerization of olefinic compounds is generally a highly exothermic reaction and careful control of temperature must be maintained. In numerous processes hydrogen is added to the reaction zone to help control the molecular weight of the polymer or polyolefin.

Feed olefinic compound to polymerization processes commonly contains impurities such as saturated materials having approximately the same molecular weight as the olefin. For example, ethylene commonly contains a small amount of ethane and in some cases smaller amounts of methane and propane. Propylene commonly contains small amounts of propane and to a lesser degree ethane and butane. Additional saturated materials can be formed in the reaction zone by reaction of the hydrogen which was added to control molecular weight of the polymer, with the olefin feed to the reactor. The olefinic compound is hydrogenated and becomes saturated, thereby forming the corresponding saturated compound of the olefin. Therefore, it can be seen that there are numerous sources of saturated material in the polymerization process. These saturated materials generally do not take part in the polymerization process but merely pass through the process unreacted. While in many cases these saturated materials are not detrimental to the polymerization reaction itself, reactor capacity can unnecessarily be used in passing through these inerts. These saturated materials are removed with final product and unreacted olefin from the reaction zone. In most processes, the unreacted olefinic compound and saturated contaminant is recycled to the reactor. As is taught in Steigelmann et al, U.S. Ser. No. 948,332 filed concurrently with this application, in order to prevent concentration of the contaminant in the reactor, a portion of this recycle stream can be sent to a membrane separation unit to separate olefinic compound for use, such as recycle to the polymerization zone. Membrane separation units often use metal containing ions to facilitate transport of olefinic compounds across a membrane. Hydrogen is commonly present in certain streams such as streams from polymerization units using hydrogen for molecular weight control. Membrane separation units can be adversely affected by hydrogen, as by changing the pH of aqueous solutions concentrated therein or reducing certain metal containing ions. One such ion, silver, can be reduced to silver metal by hydrogen thereby plugging the membrane and reducing the selectivity of the separation process. Therefore it is desirable to remove hydrogen from the stream passed to the membrane separator to prevent such detrimental effects.

It is an object of this invention to recover olefinic compound from streams comprising olefinic compound, especially those comprising olefinic compound and hydrogen.

It is an object of this invention to recover olefinic compound from streams from polymerization zones for recycle back to such polymerization zone.

It is an object of this invention to provide a method for removing hydrogen from streams containing olefinic compounds.

It is an object of this invention to provide an improved method of separating olefinic compounds from mixtures containing them.

It is an object of this invention to remove hydrogen from streams without accumulating hydrogen for disposal.

SUMMARY OF THE INVENTION

The objects of this invention can be attained by passing a stream comprising hydrogen and olefinic compound to a hydrogenation zone at hydrogenation conditions so as to at least partially hydrogenate the olefinic compound. This will effectually remove hydrogen from the stream and form saturated materials which can then be separated from olefinic compounds through the use of membrane separators thereby preventing hydrogen from reacting with metals in the membrane separator. This will also recover olefinic compounds for use.

One application for such technique is in the removal of hydrogen and recovery of olefinic compounds from streams in polymer manufacture. Hydrogen which is used for molecular weight control in the polymerization zone remains as a contaminant in unreacted olefinic streams downstream of such reaction zone. At least a portion of such stream can be sent to a hydrogenation zone so as to substantially react the hydrogen with olefinic compound, thereby saturating a portion of the olefin and effectively removing hydrogen from such stream. The mixture formed can then be passed to a membrane separation unit which will separate olefinic compounds from the mixture for recovery or recycle to the polymerization zone. Because hydrogen is removed from the stream upstream of the membrane separation unit, the unit is not adversely affected by the hydrogen and also can effectively separate olefinic compounds from the saturates formed during the hydrogenation step. Because olefinic compounds are recovered for reuse, the polymerization process is more efficient and economical, and disposal requirements are decreased. This process is described more fully below.

Briefly, this invention comprises a process for the recovery of olefinic compounds from streams comprising hydrogen and olefinic compounds comprising contacting the stream with a hydrogenation catalyst at hydrogenation conditions so as to saturate olefinic compound with hydrogen, thereby forming saturated material and substantially removing hydrogen from the stream; passing the stream containing olefinic compound and saturated material to a semipermeable membrane separator which effectively separates the olefin from the saturated material, thereby providing a purified olefin stream. In a preferred method of operation, the process comprises passing olefinic compound and hydrogen into a reaction zone; polymerizing a substantial portion of the olefinic compound so as to form a reaction mixture containing polymer and olefinic compound; passing a stream comprising reaction mixture to a separation zone wherein the stream is separated into a polymer fraction and a fraction comprising a mixture of olefinic compound, saturated material and hydrogen; recovering polymer; passing at least a portion of the mixture of olefinic compound, saturated material and hydrogen to a hydrogenation zone at hydrogenation conditions so as to hydrogenate a portion of the olefinic compound present thereby forming the saturated counterpart of the olefinic compound and substantially removing hydrogen from the mixture; passing at least a portion of the mixture comprising olefinic compound, saturated material and saturated counterpart of the olefinic compound to a membrane separator which substantially separates olefinic compound from saturated material; and recycling the recovered olefinic compound to the reaction zone.

In the manufacture of polymers, olefinic compound or a mixture of olefinic compound is passed into reaction zone for polymerization. These olefinic compounds can be straight chain or branched alpha olefins such as ethylene, propene, butene, pentene, hexene, heptene, octene and the like; $C_4$ to about $C_8$ olefins having the unsaturation in other than the alpha position; olefinic esters of fatty acids such as vinyl acetate, vinyl propionate, and the like; unsaturated acrylates such as methyl acrylate, ethyl acrylate, propyl acrylate, butyl acrylate, hydroxyethyl acrylate, 2-hydroxy propyl acrylate, 4-hydroxybutyl-1-acrylate, hydroxyethyl methacrylate, 2,3-dihydroxy propyl methacrylate and numerous others such as vinyl chloride; vinylidene chloride and bromide; the various derivatives of maleic acid or anhydride such as maleate; alpha and beta unsaturated acids such as acrylic and methacrylic acid; and others. An extremely broad spectrum of olefinically unsaturated compounds can be polymerized, and accordingly an extremely broad spectrum of olefinically unsaturated compounds can be separated from saturated materials for reuse through the use of membrane separation processes. Two of the most commercially important polymers are polyethylene and polypropylene; however, a myriad of other polymers and copolymers have been found commercially important. For example, ethylene is not only often polymerized with itself to form polyethylene, but also with other olefinic materials such as propylene, alpha olefins, acrylates, vinyl acetates, and the like. Therefore, for the purposes of this disclosure, the term polymerization shall include copolymerization, terpolymerization, etc.

Polymerization can be conducted by numerous processes, such as by solution, slurry or gas phase processes. Solution polymerization, one of the oldest techniques used, passes olefinic compound, catalyst and solvent into a reaction zone. The solvent, such as for example white oil, is relatively inert in the reaction zone and is added to dissolve the polyolefin formed in the reactor. The solvent containing dissolved or melted polymer is then passed out of the reaction zone to recover the polyolefin from the solvent and other impurities such as unreacted olefin, hydrogen and the like. In slurry polymerization, a slurry of olefinic compound and catalyst and diluent saturated hydrocarbon, such as isobutane or isopentane, is circulated in a continuous fashion. Commonly the circulation is conducted in an elongated vessel such as a looped pipe. A slip stream of the slurry is continuously removed and the polymer recovered therefrom. Most recently gas phase polymerization is being developed and implemented. Olefinic feed and a slurry of catalyst is saturated hydrocarbon such as isobutane, isopentane or hexane is passed into the reaction zone where polymerization takes place.

Polymerization of olefinic compounds is most often conducted under pressure, although in some cases pressure is not necessary. Depending on the nature of the olefinic compounds to be polymerized, desired product, catalyst and process, the reaction conditions of pressure and temperature can vary over wide ranges. U.S. Pat. Nos. 3,776,979; 3,909,207; 3,912,698; 3,995,097 and 4,003,712 teach just a few processes for the polymerization of olefins.

Two of the most commercially important polymers are polyethylene and polypropylene. These polymers are generally made using a catalyst comprising transaction metal compound in conjunction with aluminum alkyl. Some of these catalysts are commonly referred to as Ziegler type catalysts. The most commonly used transition metal comprises titanium.

One class of catalysts useful in the polymerization of propylene comprise organoaluminum compound and transition metal compound in addition to minor amounts of other additives. Useful organoaluminum compounds include trialkylaluminum, dialkylaluminum halides, mixtures of trialkylaluminum with dialkylaluminum halides and mixtures of trialkylaluminum with alkylaluminum dihalides. Also catalytic effective amounts of mixtures of trialkylaluminums and dialkylaluminum halides can be used in conjunction with alkyl aluminum dihalides. Useful halides include bromides and chlorides and useful alkyl radicals contain from two to about six carbon atoms. The preferable halide is chloride and the preferable alkyl radical is ethyl. Diethylaluminum chloride (DEAC) is most preferable. In a trialkylaluminum-dialkylaluminum halide mixture, the preferred amount of trialkylaluminum is about 20 to 50 mol percent. In a trialkylaluminum-alkylaluminum dihalide mixture, the preferred amount of trialkylaluminum is about 30 to 70 mol percent and most preferably about 40 to 60 mol percent.

The transition metal compounds useful as a component in the catalyst system of this invention are compounds of transition metals of Groups IVB, VB and VIB of the Periodic Table. Preferably, the transition metal compound is a halide of titanium, vanadium, chromium or zirconium. Most preferably, titanium trichloride and especially activated titanium trichloride is used. Titanium trichloride can be activated to a high degree of polymerization activity by chemical and physical means. One useful activated titanium trichloride has an approximate stoichiometric formula of $TiCl_3.\frac{1}{3}AlCl_3$ and has been comminuted. Further, titanium trichloride can be activated by forming adducts with Lewis bases such as ethers or by supporting the titanium trichloride on a catalytically inert substance such as a metal oxide or salt. One suitable titanium trichloride is described in U.S. Pat. No. 3,984,350 incorporated by reference herein.

The molar ratio of transition metal halide to organoaluminum compound in a catalyst system can range from about one-tenth to about 10, typically is about 1 to 3 and preferably is about 2. The amount of catalyst in a polymerization depends on the reactor size and type and on the amount and type of olefin monomer and is known to the skilled artisan.

Preferably, a catalyst system package is made prior to introduction of such package into a polymerization reactor. Catalyst components can be mixed together in any order, typically using an inert hydrocarbon or the monomer as a suitable medium, although preferably the modifiers first are added to an inert hydrocarbon solution of the organoaluminum compound. Preferably, the catalyst modifiers of this invention are added slowly while mixing to a solution of organoaluminum compound in an inert hydrocarbon. Such resulting mixture is added to a suspension of transition metal compound in an inert hydrocarbon. After complete mixing the resulting catalyst package can be introduced into a polymerization reactor. Since catalyst systems are sometimes sensitive to oxygen and moisture, suitable precautions should be taken during catalyst preparation, transfer and use.

Catalysts suitable for the polymerization of ethylene are similar to those used in the polymerization of propylene, well-known in the art, and commercially available. Some catalysts also contain additives so as to attain certain benefits such as increase the crystallinity of the product polymer.

Polymerization of ethylene or propylene can generally be practiced at pressures ranging from about atmospheric to about 20,000 p.s.i.g. and preferably from about 30 to 1000 p.s.i.g., and at temperatures in the range of about 40° to about 250° C.

The olefinic compound to be polymerized, commonly along with some contaminant saturated material, is passed into a reaction zone. In some polymerization processes, a saturated hydrocarbon solvent is also introduced to the reaction zone. Catalyst to promote the polymerization is commonly introduced into the reaction zone slurried in a diluent saturated hydrocarbon. Commonly used saturated hydrocarbons for catalyst introduction and diluent purposes are butane, isobutane, 2,2 dimethyl butane, 2,3 dimethyl butane, pentane, isopentane, 2 methyl pentane, 3 methyl pentane, hexane, isohexane, heptane, isoheptane, and the like. Hexane or isobutane are most commonly used. A substantial portion of the olefinic compound which is passed into the reaction zone is polymerized thereby forming polymer. This polymer can have a single recurring unit such as in the polymerization of a single olefinic compound or also have varying recurring units such as from the polymerization of two or more different olefinic compounds. In some cases, materials are added to the reaction zone in order to control molecular weight. Hydrogen is commonly used in the polymerization of olefins for such purpose. The hydrogen does not substantially take part in the polymerization reaction but a portion of it is consumed by saturating some olefinic compounds present in the reaction zone thereby forming the corresponding saturated compound from the olefin.

Polymerization is commonly highly exothermic and the temperature of the reaction must be controlled so as to control molecular weight and the reaction in general. This is done by heat exchange, commonly by the introduction of quench fluids so as to maintain the reaction temperature within the desired limits. Commonly used quench fluids are saturated hydrocarbons such as butane, isobutane, pentane, isopentane, hexane, isohexane, heptane, isoheptane, and the previously described saturated hydrocarbon diluents.

As can be seen from the materials which are passed into the reaction zone and from the materials formed in the reaction zone, the reaction mixture which is passed out of the reaction zone commonly comprises a mixture of materials such as polymer, catalyst residue, unreacted olefinic compound, saturated contaminants from the olefinic feed, hydrogen, saturated materials formed during the polymerization process by reaction with hydrogen, saturated hydrocarbon diluent or quench fluid, and possibly some degradation products.

A stream comprising reaction mixture is then passed to a separation zone where the stream is separated into a polymer fraction and a fraction comprising a mixture of olefinic compound, saturated hydrocarbon(s) and hydrogen. Depending on the process, the polymer can be separated from other materials by distillation, centrifugation, precipitation or other means well known in the art. Flash distillation is the most commonly used technique. Catalyst entrained in the polymer is generally killed using water or similar material so as to destroy the reactivity of the catalyst. Removal of the polymer leaves a stream containing unreacted olefinic compound, saturated material and hydrogen. Commonly the saturated material comprises hydrocarbon having two to about eight carbon atoms, including hydrocarbon quench fluid having about four to about eight carbon atoms.

Because the hydrogen which is sometimes used to control molecular weight in polyolefin processes can be detrimental to a membrane separator, it is removed from streams to be passed to such membrane separator. As is well known, hydrogen can reduce silver ion to silver metal thereby forming metallic silver within the membrane which can reduce the number of effective silver ions useful in the selective transport process and also form solid material which can plug the membrane. Hydrogen can also reduce the pH of the complexing solution and be detrimental to the fibers. In some cases, it may be desirable to select the ions for the liquid barrier so that minimal detrimental reaction takes place.

When reaction mixture from a polymerization process contains unreacted olefin and hydrogen, the stream can be contacted with a hydrogenation catalyst at hydrogenation conditions so as to saturate the olefin with the hydrogen thereby forming saturated material and substantially removing hydrogen from the stream. When such stream is passed to a membrane separator, the formed saturated materials are effectively separated from unreacted olefin.

Olefinic compounds can be saturated with hydrogen by well-known techniques and catalysts. Suitable supports comprise alumina, charcoal, kieselguhr, or high surface silica in conjunction with noble metals. About 0.1 to about 1 weight percent platinum or palladium on gamma or eta alumina is preferred. Suitable hydrogenation conditions are a temperature in excess of about 20° C., for example about 30° C. to about 200° C., and a pressure at or above atmospheric, for example about 0 to about 200 psig. Higher temperatures and pressures generally result in high hydrogenation rates and can be used; however, it is generally more economical to operate within the ranges given.

The stream from the hydrogenation zone containing olefin and saturated material can then be passed to a membrane separator which can effectively separate the olefin from the saturated material thereby providing a purified olefinic stream which can be used in the polymerization process.

The stream comprising olefinic compound and saturated material is passed to a membrane separator which substantially separates olefinic compound from saturated hydrocarbon. The recovered olefin is then recycled to the reaction zone so as to more efficiently use raw materials. The stream passed to the membrane separator can comprise the entire stream of unreacted olefin and saturated material, or only a portion of it depending on the type polymerization process and the desired purification. Buildup of saturated materials in the reactor can be prevented by sending a slip stream of the reactor recycle to the membrane separator. If an equilibrium or steady state level of saturated material is maintained in the reaction zone, sufficient purification is needed to remove approximately the amount of saturated contaminant in the fresh feed plus the amount of saturated material formed in the reactor.

In a process where significant quantities of saturated material such as polymerization solvent or quench fluid having a boiling point significantly different from the unreacted olefinic compound and other saturated contaminants is present, it is generally desirable to effect a substantial separation of these materials without passing or prior to passing them to the membrane separator. This will reduce the required size and capacity of the separator. For example, the mixture comprising unreacted olefinic compound, saturated material, and polymerization solvent or quench fluid from the polymerization reactor and polymer separation zone can be compressed and the solvent or quench fluid recovered for recycle to the reactor. The unrecovered components comprise primarily olefinic compound and saturated material (other than solvent and quench fluid) which can, or a portion of which can, be passed to a membrane separator to separate olefin from saturated material.

The membrane separator or separation zone comprises a semipermeable membrane and is capable of separating olefinic compound from mixtures containing them. Preferably the separator comprises a semipermeable membrane which is used in conjunction with a liquid barrier comprising aqueous metal containing ions capable of forming soluble-reversible complexes with the olefinic compound to be separated. By maintaining a suitable partial pressure or fugacity differential of the olefinic compound to be separated across the membrane, the olefin is selectively transported across the membrane and the liquid barrier so as to effectively and substantially separate the olefin from saturated hydrocarbons. The partial pressure or fugacity differential across the membrane can be maintained by removing olefinic compound which is passed through the semipermeable membrane with a liquid or gaseous sweep comprising saturated hydrocarbon or other suitable fluid. Suitable saturated hydrocarbons are preferably the same saturated hydrocarbons which can be used as diluents and/or catalyst carriers in the polymerization process. This type of separator and process is more fully described in U.S. Pat. Nos. 3,758,603; 3,758,605; 3,770,842; 3,812,651; 3,844,735; 3,864,418; 4,014,665; and 4,060,566 which are hereby incorporated by reference and made a part hereof. U.S. Pat. No. 4,060,566 discloses that the sweep fluid such as butane, hexane or others may be used to remove olefins from the vicinity of the membrane may also serve in downstream processing of the separated material, either as a reactant, or as a solvent.

The essentially solid, water-insoluble, semi-permeable membranes or films employed in the process of the present invention can be hydrophobic, but preferably are hydrophilic. Hydrophilic membranes permit the liquid barrier to be within the membrane at least to a significant extent. The hydrophilic membranes include membranes which contain additional hydrophilic and/or hygroscopic agents, but also those membranes that do not contain such agents. A film membrane is considered hydrophilic if it absorbs at least about 5 weight percent of water when immersed in distilled water for one day at room temperature and pressure. Typical membranes are those formed of film-forming materials such as nylon, e.g. the N-alkoxyalkyl polyamides, and those formed of nylon and more hydrophilic polymers such as polyvinyl alcohol, polyvinyl ethers, polyacrylamides and the like. A preferred material is cellulose triacetate. The polymer materials can be formed into single membrane structures of desired configurations, as for example, by casting. The hollow fiber membranes are preferred because they provide a large surface contact area for a given equipment volume. For instance, separation can be achieved using hollow fiber membranes when the feed gas is passed to the outside of the fibers, the sweep fluid is passed through the inside of the fibers and the material undergoing separation passes from the outside to the inside of the hollow fibers. The separation can also be achieved using hollow fiber membranes by passing feed gas through the inside of the fibers and passing sweep fluid to the outside of the fibers. In this case the olefin passes from the inside to the outside of the hollow fibers. In the operation of the method of the invention, the fibers may preferably be flooded with the liquid barrier solution to enhance the separation of the desired material over a period of operation and prevent drying or selectivity loss of the membrane.

In the separation process, the aqueous liquid barrier contains a component which provides in solution ions capable of forming a complex with the material desired to be separated from a fluid mixture. The source of the ions can be added to the membrane or be mixed with the polymer or film-forming constituents prior to formation of the film. The complex-forming component can be impregnated into the membrane in an aqueous or other form and in any event, the membrane is in contact with sufficient water to form the aqueous liquid barrier when used in the separation process. The membrane may tend to dry during use even when the membrane contains major amounts of hydrophilic polymers. This drying can result in a considerable decrease in permeability and in selectivity for the separation and can be counteracted by, for instance, adding water or an aqueous solution containing the complex-forming metal to the feed side of the semi-permeable membrane, or by contacting the product side of the membrane with an aqueous liquid medium as described in abandoned application Ser. No. 498,112, filed Aug. 16, 1974, herein incorporated by reference. It may be most convenient to humidify the feed to the membrane separator.

The amount of water in the liquid barrier employed can be a minor portion of the liquid phase, but preferably is a major portion or even substantially all of the liquid, on a metal compound-free basis. Thus, small or minor amounts of water, say as little as about 5 weight percent, on a metal compound-free basis, in the liquid phase can serve to provide a significant transport across the liquid barrier of the material to be separated. Any other liquid present in the barrier is preferably water-miscible and should be chosen as not to have a substantial deleterious effect on the separation to be accomplished. The liquid barrier can also contain other materials in, e.g. minor amounts, such as hygroscopic agents to improve the wetting or hydrophilic properties of the liquid and provide better contact with the feed gas. The liquid barrier can contain minor but effective amounts of hydrogen peroxide to retard reduction of the complex-forming metal ions, e.g. silver, to their elemental forms.

In the present invention, the metal component in the liquid barrier solution, which metal can serve in the form of metal-containing cations to separate a component from a mixture through the formation of metal complexes of desired properties, include, for instance, the transition metals of the Periodic Chart of Elements having atomic numbers above 20. Among the useful metals are preferably silver and cuprous ions, especially silver ions. Various combinations of the complex-forming metals can also be employed in this invention, either in the presence or absence of other non-metal or non-complexing metal components. The metal is provided in the aqueous liquid barrier of the separation system in a form which is soluble in this liquid. Thus, the various water-soluble salts of these metals can be used such as the nitrates and halides, for instance, the bromides and chlorides, fluoborates, fluosilicates, acetates, carbonyl halides or other salts of these metals which can serve to form the desired water-soluble complexes when the film is in contact with water. The metal salts should not react with any components of the chemical feedstock used in the separation procedure to form an insoluble material which could block the film membrane or otherwise prevent the separation of a component from the feedstock. Also, in a given system, the metal is selected so that the complex will readily form, and yet be sufficiently unstable, so that the complex will decompose and the dissociated material leave the liquid barrier, thereby passing the material to be separated from the feed side of the membrane to the product side. The concentration of the metal ions in the liquid barrier can be rather low and still be sufficient to provide an adequate complexing rate so that excessive amounts of the semi-permeable membrane surface will not be needed to perform the desired separation. Conveniently, the concentration of the complex-forming metal ions in the aqueous solution forming the liquid barrier is at least about 0.1 molar and is preferably about 0.5 to 12 molar. Advantageously, the solution is less than saturated with respect to the complex-forming metal ions to insure that essentially all of the metal stays in solution, thereby avoiding any tendency to destroy the permeability characteristics of the membrane.

In some cases it is desirable to add an oxidizing agent to the liquid barrier so as to prevent the reduction of certain ions such as $Ag^+$ to the metal. This reduction can cause loss of selectivity and membrane plugging. The oxidizing agent should not be detrimental to the membrane or the separation process. Some suitable oxidizing agents are nitrate, perchlorate, tetrafluoroborate salts of $Hg^{+2}$, $Tl^{+3}$, $Ce^{+4}$, and $Co^{+3}$, peroxides such as $H_2O_2$, and the like. $H_2O_2$ is preferably used because of low cost, good water solubility, and convenience.

The rate of permeation of the material separated through the semi-permeable membrane is enhanced by operating at above atmospheric pressure. In some cases the elevated total pressure can be at least about 60 pounds per square inch gauge on the feed side of the semi-permeable membrane and the difference in total pressure across the membrane is up to about 25% of the total pressure on the feed side of the membrane. Stated in another way, the latter value for the total pressure on the product side is about 75 to 125% of the total pressure on the feed side of the membrane. In the process, a complex-forming, fluid material is separated from the feed mixture by contacting the latter with a first side of the membrane while having a partial pressure or fugacity of the material on a second or product side of the semi-permeable membrane which is sufficiently less than the partial pressure of the material in the mixture to provide separated material on the second side of the membrane. The separated material can be removed from the vicinity of the second side of the membrane by, for instance, the use of a sweep or purge fluid.

In an aspect of the process of this invention, the total pressure on the feed side of the semi-permeable membrane is preferably at least about 60 psig or even at least about 100 psig. The total pressure on the product side of the semi-permeable membrane is elevated, and often is at least about 50 psig. Preferably, the total pressure on the product side is within about 10 psi of the total pressure on the feed side, or even within about 5 psi of the total pressure on the feed side, and within about 25% of the total pressure on the feed side. The total pressure on the product side of the semi-permeable membrane can exceed that on the feed side so long as there is a higher partial pressure or fugacity of the material to be separated on the feed side compared with that on the product side of the semi-permeable membrane. Any difference in total pressure between the feed side and product side of the semi-permeable membrane should not, in any event, be so great as to rupture or otherwise be unduly deleterious to the semi-permeable membrane or separation effectiveness. When the total pressures on the feed and product sides of the membrane are substantially equal, high permeation rates with desirable product purities may be obtained. Conveniently, the total pressure of the feed is up to about 1000 psig; however, higher total pressures can be employed where desired. More commonly pressures of less than about 500 psig are used.

The partial pressure or fugacity of the material to be separated is greater on the feed side of the semi-permeable membrane used in this invention than the partial pressure of the material on the product side of the membrane. This partial pressure drop of the material to be separated is sufficient for the desired separation to result, and can often be at least about 0.5 pound per square inch, and is preferably at least about 20 pounds per square inch. The lower partial pressure of the material on the product side of the semi-permeable membrane can be maintained by employing a sweep, or purge, fluid to remove the material from the vicinity of the semi-permeable membrane. The sweep fluid is preferably inert to forming a complex or otherwise reacting with the metal-containing ions in the liquid barrier in contact with the semi-permeable membrane.

The use as the sweep fluid of a liquid or gaseous solvent in which the separated material is soluble can be beneficial since this may facilitate obtaining a desirable total pressure on the product side of the semi-permeable membrane, especially at high operating pressures. The sweep fluid, prior to contacting the exit side of the membrane, can contain dissolved separated material; however, it is preferred that the concentration of the material at this point be only up to about 25 percent of saturation. The sweep fluid can be essentially inert to forming a complex with the metal ions in solution in the liquid barrier, and can be substantially immiscible with the liquid barrier.

When employing a sweep fluid to remove the separated material from the vicinity of the product side of the semi-permeable membrane, the rate of solution of the separated material in the fluid can decrease with increased saturation of the fluid with the material. Generally, the sweep fluid after passing through the vicinity of product side of the semi-permeable membrane is less than saturated, for instance, up to about 70 weight percent saturated, preferably up to about 50 weight percent saturated. Typical sweep fluids which can be employed in the method of this invention, especially when the material separated is an aliphatically unsaturated hydrocarbon, include hydrocarbon solvents such as paraffins, or mixtures containing paraffins, such as normal or branched chain paraffins of two to about eight carbon atoms.

The temperature across the liquid barrier-semi-permeable membrane composite employed in the separation procedure of this invention can be essentially constant or it may vary, and decomposition of the metal complex can be effected primarily by the drop in partial pressure of the material to be separated on the product or exit side of the liquid barrier compared with its partial pressure on the feed side. Conveniently, the temperature of the liquid barrier may be essentially ambient, especially in the case of feedstocks that are gaseous at this temperature and the pressure employed on the feed side of the liquid barrier. The temperature of the liquid barrier may, however, be reduced or elevated from ambient temperature. Often, the temperature may be up to about 50° C., and elevated temperatures may even be desired to put the feedstock in the gaseous or vapor phase. However, the temperature should not be so high as to be detrimental to the membrane or the liquid barrier. Elevated temperatures, for instance, about 35° C. or more, may provide significant increases in permeation rates as compared to similar separation operations conducted at ambient temperatures. For instance, a 50% increase in permeation rate of ethylene may be noted by increasing the operating temperature from about 24° C. to 38° C. Neither the temperature nor the pressure used should, however, be such as to unduly reduce the transport rate across the liquid barrier, semi-permeable film composite, of the material whose separation is sought, compared with that of the other components of the feed. The conditions should also not be such that physical disruption of the liquid barrier or any other significant malfunction results.

The mixture containing the material to be separated can be essentially in the gaseous or vapor phase, or liquid phase when in contact with the liquid barrier having dissolved therein one or more metal-containing ions which form a complex with the material to be separated. The liquid barrier can be partially or essentially entirely within the semi-permeable membrane. The semi-permeable membrane is essentially impermeable to liquid flow therethrough under the conditions of use, and preferably is essentially impermeable to gaseous flow therethrough. The membrane can be said to somewhat immobilize the liquid barrier adjacent to or within the membrane, and the membrane in the presence of the liquid barrier is selective to the passage of the component of the feedstock to be separated. Since there is litte, if any, passage for the feedstock across the separation zone except by becoming part of or reacting with the liquid barrier, this liquid barrier controls the selectivity of the liquid barrier-semi-permeable membrane combination.

The liquid barrier contains sufficient water and water-soluble, metal-containing ions to form a suitable complex with at least one component of the feed subjected to the separation procedure. The metal ions form the complex upon contact with the feed, and, in addition, the complex dissociates back to the metal-containing ion and a component of the complex which was in the feed, under the conditions which exist on the discharge side of the liquid barrier and semi-permeable membrane as employed in the process. The released feed component exits the discharge side of the membrane and can be removed from the vicinity of the barrier and its supporting structure as by a sweep fluid. In some cases the sweep fluid is selected so that it is easier to separate from the separated component than the other contaminants in the feed. In other cases, no separation of the sweep fluid from the separated component is necessary. Thus, the metal complex forms and is decomposed in the complex metal ion-containing liquid barrier, and, as a result, the material passing through the barrier is more concentrated with respect to at least one component present in the feed stream.

Figure 1:
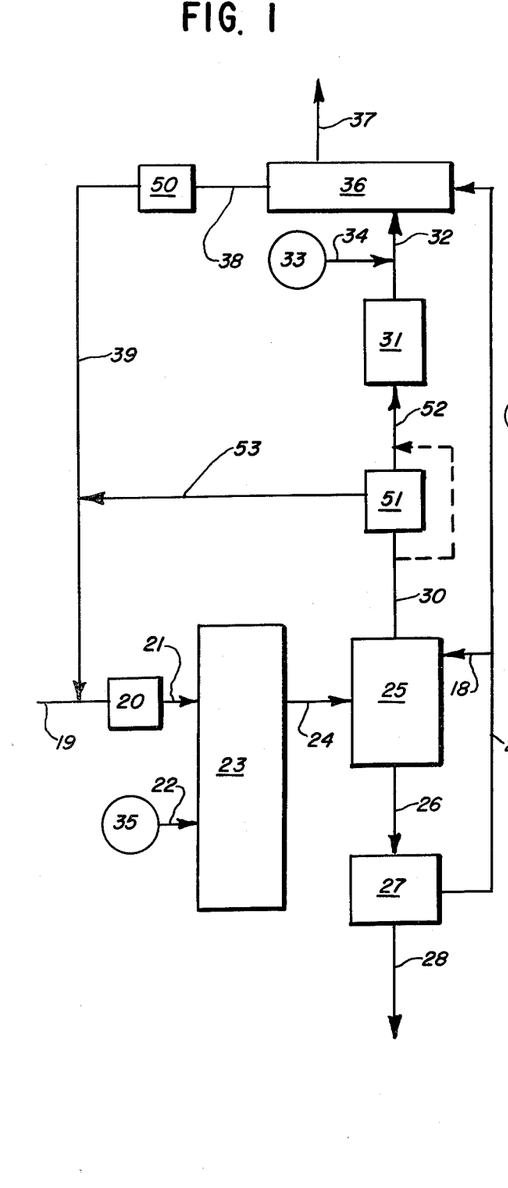
FIG. 1 is a schematic diagram of a polyolefin process embodying applicants invention.

A mixture of olefinic compound (propylene) and small amount of saturated hydrocarbon contaminant (propane) is passed through line 19 to a dryer 20 where water can be removed to the desired level for polymerization, generally less than about 10 ppm. Commonly, fresh feed to propylene polymerization process comprises about 99.5 weight percent propylene, 0.5 weight percent propane, and trace or other impurities. The dryer can conveniently comprise a molecular sieve dryer. The mixture of propylene and propane contaminant is then passed through line 21 to polymerization zone 23, in this case a slurry polymerization zone. Because of recycle from line 39, the actual feed to the polymerization zone is somewhat different from the fresh feed from line 19. The feed to the reactor commonly comprises about 5–15 weight percent propane, about 20–30 weight percent hexane solvent, and about 55–75 weight percent propylene. Saturated hydrocarbon diluent is present in this type of process during the polymerization of olefin to facilitate heat exchange and the separation of growing polymer particles from each other. Additional hexane may be added for these purposes. A titanium Ziegler type polymerization catalyst 35, comprising activated titanium trichloride in conjunction with alkyl aluminum compound commonly slurried with a saturated hydrocarbon such as hexane, is passed through line 22 into reactor 23 so that it can effectively catalyze the polymerization of olefin in such reaction zone. Reaction zone conditions may vary depending on catalyst activity, reactor design, product specification and other parameters. The reactor can be operated in the range of about 100°–200° F. and about 200–300 psig.

Polymerized olefin (polypropylene), hexane, propane and unreacted olefinic compound (propylene) are removed from reaction zone 23 through line 24 to quench zone 25. In some cases hydrogen is added to the polymerization reactor to control molecular weight. In these cases hydrogen will also be removed from the reactor. The hydrogen will also saturate some of the propylene in the reactor thereby forming propane and other saturates. A typical stream removed from the reactor comprises about 25–35 weight percent polypropylene (including about 3–5 percent attactic), about 25–30 weight percent propylene, about 10–15 weight percent propane, about 25–30 weight percent hexane, less than about 0.1 weight percent hydrogen, less than about 0.1 weight percent nitrogen, and less than about 0.1 weight percent catalyst residue. In quench zone 25 the reaction is quenched, commonly by the addition of saturated hexane quench fluid, so as to lower the temperature. In some polymerization reactors the quench zone is within the reactor. Light gases and hydrocarbons such as unreacted propylene, propane contaminant and some hexane are passed out of quench zone 25 through line 30. Polymer, quench fluid and/or saturated hydrocarbon diluent (hexane) are passed from quench zone 25 through line 26 to separation zone 27 where saturated hydrocarbon is separated from the polymer and passed out through line 29. The separation zone 27 can be a filter or cyclone separator and can also be followed by a flash drum or steam strip to aid in light hydrocarbon removal. Polymer is recovered through line 28. The mixture of unreacted olefin (propylene), saturated hydrocarbon contaminant (propene), hexane and hydrogen is passed from quench zone 25 through line 30 to a two stage compressor 51 with interstage separation. A major proportion of the hexane, and to a lesser degree propylene and propane are then recycled through lines 53 and 39 back to reactor 23. A minor proportion of the material from line 30 and compressor 51, generally deficient in hexane, is passed on to a membrane separator for purification. The entire stream from line 30 can bypass compressor 51, however when substantial amounts of solvent having a substantially different boiling point than the olefin and other contaminants is present, it is generally preferable to remove the solvent by a compression step. Because hydrogen can reduce certain metal ions such as silver ion to silver metal, thereby forming metallic silver which can plug a membrane separator and destroy its selectivity, an optional system 31 is provided to remove hydrogen. This can be easily done by providing a hydrogenation catalyst which will react the hydrogen with olefin present to form saturated hydrocarbon, thereby removing the hydrogen from the stream passing through line 52. This system will also saturate any trace amounts of acetylene present, thereby preventing the formation of insoluble material in the separation unit by reaction with silver ion. Therefore, the mixture of unreacted olefin and saturated hydrocarbon contaminant and hydrogen are passed through zone 31 where such mixture is contacted with a platinum or palladium on charcoal catalyst, thereby substantially removing such hydrogen by saturating some of the unreacted olefin. A suitable catalyst comprises about 0.5 weight percent palladium on gamma alumina. The hydrogenation can conveniently be carried out at a temperature of about 120° F. and a pressure of about 100 psig. The mixture of saturated hydrocarbon contaminant and unreacted olefin is passed out of zone 31 through line 32 where it can be humidified with water 33 injected through line 34. The feed to the membrane separator is humidified to prevent drying of the liquid barrier therein and prevent loss of selectivity. The mixture of unreacted olefin and saturated hydrocarbon contaminant is then passed to a semipermeable membrane separator 36 which effectively separates olefin from saturated components.

In this separation zone the mixture of hydrocarbons to be separated is contacted on one side of a semipermeable membrane. The semipermeable membrane is used in conjunction with a liquid aqueous barrier containing metal containing ions which are capable of forming reversible water soluble complexes with the olefin to be separated. A saturated hydrocarbon is passed on the second side of the membrane so as to sweep away olefin and reduce the partial pressure of olefin on the second side of the membrane, thereby facilitating transport of the olefin across the membrane and liquid barrier.

A portion of the stream from separation zone 27 is passed through lines 29 and 18 as recycle to the quench zone. Saturated hydrocarbon diluent is passed from line 29 through semipermeable membrane separator 36 to act as a sweep fluid removing unreacted olefin which has permeated through the membrane and thereby reducing the partial pressure of the olefin on the second side of the membrane. The purified unreacted olefin stream is passed out of separation zone 36 through line 38 through protective blowdown drum 50 for injection through line 39 into line 19 for recirculation to polymerization zone 23. Blowdown drum 50 is included as a protective device to prevent aqueous liquid from being carried downstream in the event of upset or membrane rupture. Saturated hydrocarbons are passed out of separation zone 36 through line 37 for recovery and use.

Figure 2:
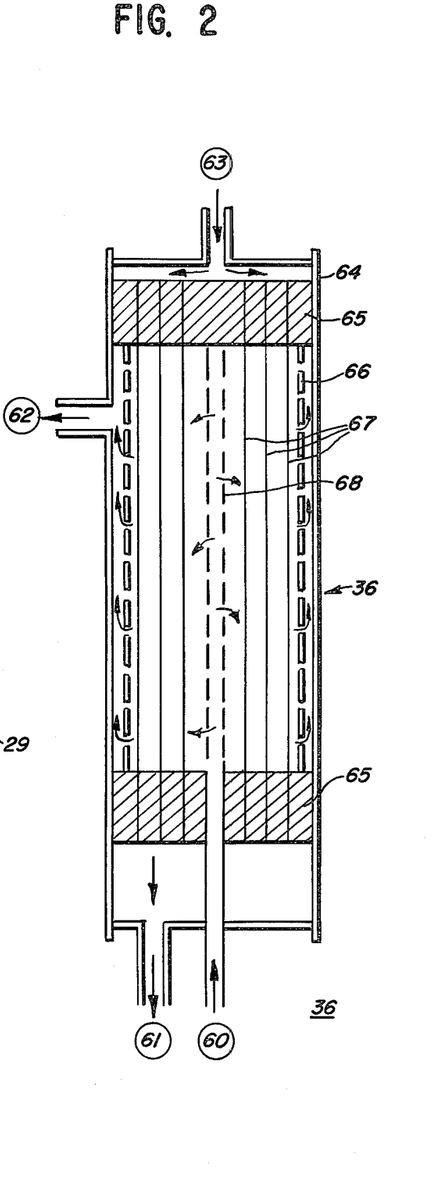
FIG. 2 is a schematic drawing of a membrane separation unit.

A schematic drawing of a membrane separation unit suitable for use in this process can be seen in FIG. 2. This membrane separation unit 36 generally comprises an outer shell 64 which contains a large number of hollow fiber membranes similar to those used in reverse osmosis. These fiber membranes or bundles of such fiber membranes 67 are positioned in an elongated manner within the outer shell 64 and secured by potting in an epoxy resin compound 65. The hollow fiber membranes 67 can be made out of a variety of materials especially polymeric materials. Preferably these fibers are made of cellulose triacetate. Also located within the outer shell 64 is a distribution system, in this case a perforated tube distributor 68 centrally located within the unit. This is merely a device for allowing the purge of fluid to be introduced and distributed within the membrane separation unit. Because of the internal portion of the membrane separation unit is subjected to pressure a mechanical device 66 is provided between the potted ends of the fibers 65 so as to prevent compression of the fibers and possible damage thereto. This simple mechanical device must also provide for the passage of fluids so that fluids introduced into the membrane separation unit can pass out.

The membrane is preferably used in conjunction with an aqueous barrier containing metal containing ions so as to facilitate transport of olefins across the membrane. A suitable liquid barrier comprising 6 N silver nitrate is impregnated on the fibers 67 through the bores of the fibers. This can be done by filling the unit or fibers with silver nitrate solution and subjecting it to pressure so that the silver nitrate solution is forced into the fiber walls. Additional silver nitrate solution can be occluded onto the fibers themselves.

The hexane purge fluid 60 is passed into the membrane separation unit and passes out of the slotted distribution tube 68 into the body of the membrane separator. The membrane separator is filled with hollow tubular membranes which are impregnated with 6 normal silver nitrate and potted at the ends in an epoxy resin 65. The mixture of materials to be separated 63 is passed into one end of the separation unit into a manifold area and then passes through the central portion of the fiber membranes. The olefin which is present in the mixture to be separated complexes with the silver ions in the liquid barrier and is transported across the membrane by maintaining a partial pressure differential across the membrane. This is done by the flow of hexane through the interior of the separation unit 36 which sweeps away olefin which has permeated through the membrane wall. The mixture of hexane and olefin passes through the inside of the membrane and out of the membrane separation unit through line 62. The materials which do not pass through the membranes, generally a stream enriched in saturates, passes out of the membrane separator at line 61.

It is preferable to dry the fibers prior to gluing with the epoxy compound. These fibers tend to shrink upon drying and if not predried prior to potting in the epoxy compound they can dry and subsequently shrink while the membrane unit is being used and cause leakage of fluids and loss of selectivity. This membrane separation unit can be made by modification of permeators which are made for reverse osmosis such as those made by the Dow Chemical Company. For example, the Dowex RO-4K permeator can be modified as taught in concurrently filed patent application U.S.S.N. 948,339, filed Oct. 4, 1978.

The following represents typical data using a process for the recovery of olefinic compound, essentially the same as that described above, except the separated propylene is recovered from a vent stream for the polymerization unit.

EXAMPLE 1

| | Mole % | | |
|---|---|---|---|
| | Feed to Hydrogenation Unit | Feed to Separation Unit | Permeate from Separation Unit |
| $H_2$ | 3.85 | 0.02 | <0.01 |
| $N_2$ | 2.22 | 4.92 | — |
| $C_1$ | 2.40 | 1.63 | 0.30 |
| $C_2$ | 1.60 | 1.15 | 0.1 |
| propylene | 79.74 | 78.35 | 96.63 |
| propane | 8.53 | 13.31 | 3.20 |
| $C_6H_{14}$ | 1.66 | 0.61 | — |

EXAMPLE 2

| | Mole % | | |
|---|---|---|---|
| | Feed to Hydrogenation Unit | Feed to Separation Unit | Permeate* from Separation Unit |
| $H_2$ | 3.93 | <0.02 | <0.01 |
| $N_2$ | 1.61 | 1.77 | — |
| $C_1$ | 3.71 | 3.93 | 0.72 |
| $C_2$ | 1.21 | 1.27 | 0.20 |
| propylene | 77.67 | 77.15 | 97.37 |
| propane | 11.00 | 15.36 | 1.71 |
| $C_6$ | 0.87 | 0.52 | — |

*Data for permeate from separation unit is normalized to eliminate hexane and nitrogen values and readjust remaining total values to 100 percent. The hexane and nitrogen present in these cases were attributable to the method of operating test equipment and therefore not relevant to an accurate representation of the separation data.

EXAMPLE 3

| | Mole % | | |
|---|---|---|---|
| | Feed to Hydrogenation Unit | Feed to Separation Unit | Permeate* from Separation Unit |
| $H_2$ | 1.58 | <0.01 | <0.01 |
| $N_2$ | 0.98 | 0.99 | — |
| $C_1$ | 2.84 | 2.98 | 1.10 |
| $C_2$ | 1.46 | 1.51 | 0.57 |
| propylene | 79.58 | 79.36 | 95.07 |
| propane | 12.43 | 14.50 | 3.56 |
| $C_6H_{14}$ | 1.13 | 0.66 | — |

*Data for permeate from separation unit is normalized to eliminate hexane and nitrogen values and readjust remaining total values to 100 percent. The hexane and nitrogen present in these cases were attributable to the method of operating test equipment and therefore not relevant to an accurate representation of the separation data.

This data demonstrates that polymerization streams can be treated so as to remove hydrogen by reacting the hydrogen present with olefins compounds, and to recover olefinic compound for reuse, such as recycle to the polymerization zone, through the use of hydrogenation zones and membrane separation units. The olefin, which would normally be flared, is recovered and used as monomer feed to the polymerization unit.

We claim:
1. A process for recovering olefinic compound from streams comprising hydrogen and olefinic compounds comprising:
   contacting the stream with a hydrogenation catalyst at hydrogenation conditions so as to saturate olefinic compound with hydrogen thereby forming saturated material and substantially removing hydrogen from the stream;
   passing the stream comprising olefinic compound and saturated material to a semipermeable membrane separator which effectively separates the olefin from the saturated material, thereby providing a purified olefin stream.
2. The process of claim 1 wherein the semipermeable membrane separator comprises a semipermeable membrane used in conjunction with a liquid barrier containing aqueous metal containing ions capable of forming soluble-reversible complexes with the olefinic com- pound to be separated, and a partial pressure differential of the olefin is maintained across the membrane.

3. The process of claim 2 wherein said partial pressure differential is maintained by removing olefinic compound which has passed through the semipermeable membrane with a sweep fluid comprising saturated hydrocarbon.

4. The process of claim 3 wherein the olefinic compound comprises olefin containing two to about eight carbon atoms.

5. The process of claim 4 wherein the olefin comprises ethylene or propylene.

6. The process of claim 2 wherein the metal containing ions comprise silver or cuprous ions.

7. The process of claim 5 wherein the metal containing ions comprise silver or cuprous ions.

8. The process of claim 1 wherein the hydrogenation catalyst comprises a noble metal on a solid support.

9. The process of claim 8 wherein the hydrogenation catalyst comprises about 0.1 to about 1.0 weight percent platinum or palladium on a support comprising gamma or eta alumina.

10. An improved process for the manufacture of polymer comprising:
   passing olefinic compound and hydrogen into a reaction zone;
   polymerizing a substantial portion of the olefinic compound so as to form a reaction mixture containing polymer and olefinic compound;
   passing a stream comprising reaction mixture to a separation zone wherein the stream is separated into a polymer fraction and a fraction comprising a mixture of olefinic compound, saturated material and hydrogen;
   recovering polymer;
   passing at least a portion of the mixture of olefinic compound, saturated material and hydrogen to a hydrogenation zone at hydrogenation conditions so as to hydrogenate a portion of the olefinic compound present thereby forming the saturated counterpart of the olefinic compound and substantially removing hydrogen from the mixture
   passing at least a portion of the mixture comprising olefinic compound, saturated material and saturated counterpart of the olefinic compound to a membrane separator which substantially separates olefinic compound from saturated material; and
   recycling the recovered olefinic compound to the reaction zone.

11. The process of claim 10 wherein said membrane separator comprises a semipermeable membrane.

12. The process of claim 11 wherein the semipermeable membrane is used in conjunction with a liquid barrier comprising aqueous metal containing ions capable of forming soluble-reversible complexes with the olefin to be separated, and a partial pressure differential of the olefinic compound is maintained across the membrane.

13. The process of claim 12 wherein said partial pressure differential is maintained by removing olefinic compound which has passed through the semipermeable membrane with a liquid sweep comprising saturated hydrocarbon.

14. The process of claim 10 wherein the olefinic compound comprises an olefin containing two to about eight carbon atoms.

15. The process of claim 14 wherein the olefin comprises ethylene.

16. The process of claim 14 wherein the olefin comprises propylene.

* * * * *